United States Patent
Seo et al.

(10) Patent No.: US 7,861,311 B2
(45) Date of Patent: Dec. 28, 2010

(54) APPARATUS AND METHOD OF MANAGING HIDDEN AREA

(75) Inventors: Dong-young Seo, Hwaseong-si (KR);
Moon-sang Kwon, Seoul (KR);
Hee-sub Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1014 days.

(21) Appl. No.: 11/650,941

(22) Filed: Jan. 9, 2007

(65) Prior Publication Data
US 2007/0180535 A1 Aug. 2, 2007

(30) Foreign Application Priority Data
Jan. 11, 2006 (KR) .................... 10-2006-0003323

(51) Int. Cl.
G06F 21/00 (2006.01)
G06F 17/30 (2006.01)
G06F 12/00 (2006.01)
G06F 12/14 (2006.01)
H04L 29/06 (2006.01)

(52) U.S. Cl. .................... 726/27; 726/26; 707/821; 707/822; 707/828; 713/165

(58) Field of Classification Search ................ 711/159, 711/161, 163; 713/165, 164; 707/102, 200, 707/204, 821–823, 828–830
See application file for complete search history.

(56) References Cited

U.S. PATENT DOCUMENTS

| | | | |
|---|---|---|---|
| 5,832,522 A * | 11/1998 | Blickenstaff et al. ................ 1/1 |
| 6,154,818 A * | 11/2000 | Christie ....................... 711/163 |
| 6,647,481 B1 * | 11/2003 | Luu et al. .................... 711/206 |
| 6,742,094 B2 | 5/2004 | Igari | |
| 6,915,420 B2 * | 7/2005 | Hensley ......................... 713/2 |
| 2003/0208686 A1 | 11/2003 | Thummalapally et al. | |
| 2007/0002612 A1 * | 1/2007 | Chang et al. ........... 365/185.01 |
| 2008/0229428 A1 * | 9/2008 | Camiel ........................ 726/27 |

FOREIGN PATENT DOCUMENTS

CN           1417689 A   *   5/2003

(Continued)

OTHER PUBLICATIONS

Wolfe H. Evidence Analysis, Computers and Security vol. 22 (4), May 2003.*
Stoffregen , Paul. "Understanding FAT32 Filesystems." PJRC. Feb. 24, 2005. Web. <http://www.pjrc.com/tech/8051/ide/fat32.html>.*
"Fat: General Overview of On-Disk Format." Hardware White Paper: Designing Hardware for Microsoft Operating Systems. (1999): Print.*

(Continued)

*Primary Examiner*—Farid Homayounmehr
*Assistant Examiner*—Imhotep Durham
(74) *Attorney, Agent, or Firm*—Sughrue Mion, PLLC

(57) ABSTRACT

Provided is a method of hiding a specified directory with no effect on compatibility with an existing file system. According to an aspect of the invention, an apparatus for managing a hidden area includes a hidden area generation unit which sets a portion of the data area as a hidden area and records meta data for the set hidden area, a hidden area release unit which moves a directory entry of a root directory of the hidden area into the directory entry area and returns a cluster recorded with the meta data to release the set hidden area, and an access control unit which controls an access to the hidden area when the hidden area is set.

28 Claims, 8 Drawing Sheets

FOREIGN PATENT DOCUMENTS

| | | |
|---|---|---|
| JP | 7-175710 A | 7/1995 |
| JP | 2003-134455 A | 5/2003 |
| KR | 10-2003-0005760 A | 1/2003 |
| KR | 10-2003-0008732 A | 1/2003 |
| WO | WO 2005078987 A1 * | 8/2005 |

OTHER PUBLICATIONS

Ionescu, Alex. "NTFS On-Disk Structures: Visual Basic NTFS Programmer's Guide." 2004. Relsoft Technologies. <http://www.alex-ionescu.com/NTFS.pdf>. pp. 1-4, 10, and 17.*

Office Action dated Apr. 20, 2010 from the Japanese Patent Office in counterpart application 2007-1993.

* cited by examiner

APPARATUS AND METHOD OF MANAGING HIDDEN AREA

CROSS REFERENCE TO RELATED APPLICATION

This application claims priority from Korean Patent Application No. 10-2006-3323 filed on Jan. 11, 2006 in the Korean Intellectual Property Office, the disclosure of which is incorporated herein by reference in its entirety.

BACKGROUND OF THE INVENTION

1. Field of the Invention

The present invention relates to a file system, and more particularly, to a method of hiding a specified directory with no effect on the compatibility of an existing file system.

2. Description of the Related Art

In general, an operating system (OS) uses a file system in order to manage data on a system, in which the operating system is installed. The file system is a logical structure that should be constructed in order to manage files. For example, in a Microsoft Windows operating system environment, a format command is a process of creating and initializing such a file system. As such, after the file system is generated, a user can store or delete the files.

Various file systems exist depending on the type of various operating systems. Various file systems, such as the File Allocation Table (FAT) file system or New Technology File System (NTFS) in Microsoft Windows operating systems environment, and Unix File System (UFS), Extended 2 (EXT2), Extended 3 (EXT3), Journaled File System (JFS) in operating systems of Unix/Linux exist. These file systems each provide various additional functions, such as data encryption or data compression.

The known file system for storing and managing the files can be generally divided into two areas. One is a data area where actual data of the file is stored, and the other is information area where information pertaining to the file is stored. In the information area, the attribute, rights, name, and position of the file are stored.

In particular, the FAT file system (FAT12, FAT16, or FAT32) uses information of a parent directory in order to access files or directories. During this time, the file system queries a hidden area manager whether the parent directory, or a search directory or file exists in the hidden area. When the directory or file exists in the hidden area, unlike an operation method of a normal FAT file system, information is not read from the physical storage device, and information possessed by the hidden area manager is used.

FIG. 1 is a diagram showing the schematic configuration of a FAT file system 5. The file system 5 has an Master Boot Record (MBR) area 1, a FAT area 2, a directory entry area 3, and a data area 4. Of these, the MBR area 1, the FAT area 2, and the directory entry area 3 are information areas of the file system 5.

The MBR area 1 is a common portion, regardless of an operating system, and is located at the top of a physical storage medium, such as a hard disk. The MBR area 1 includes information on partitions and execution codes related to booting.

One or more files on the FAT file system 5 are read through the following steps. First, a first cluster number is read from the directory entry area 3 through a file name and an extension. Then, data dispersed in the data area is read from positional information in the FAT area 2 through the first cluster number by connecting clusters where specified data is stored.

In contrast, in a process of storing files in the file system, first, information of the files to be stored is stored in the information area. At this time, information of the file size, and first cluster number is stored in the directory entry area 3, and positional information of data is stored in the FAT area 2. Next, actual data of the file is stored in the data area 4. In a file system other then the FAT file system, basically, the files are managed in the information area and the data area.

In recent years, in order to prevent leakage of personal information or important data, security is increasingly demanded in a mobile apparatus or an internal apparatus. However, in a FAT file system that is widely used in such apparatuses, a function of hiding a specified file or folder in a file system level is not provided.

Conventionally, in a FAT file system, the attribute of the file or directory can be set as "hidden". However, this method merely sets the attribute, and any application can cause the content of a file or a directory having a hidden attribute to be viewed (hidden file view function), and can access the file or directory at any time.

Accordingly, a technique that can keep security from the access of the application by hiding the specified file or directory in the file system level is demanded.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and an apparatus for providing file/directory security at a file system level by forming a hidden area that is directly shown to a user, thereby excluding a specified access method.

The present invention also allows the apparatus to maintain compatibility with an existing file system.

Aspects of the present invention are not limited to those mentioned above, and other aspects of the present invention will be apparently understood by those skilled in the art through the following description.

According to an aspect of the invention, an apparatus for managing a hidden area, which, in a file system having a FAT area, a directory entry area, and a data area, sets a portion of the data area as a hidden area, and controls an access to the set hidden area, includes a hidden area generation unit setting a portion of the data area as a hidden area and recording meta data for the set hidden area, a hidden area release unit including a directory entry of a root directory of the hidden area in the directory entry area and returning a cluster recorded with the meta data so as to release the set hidden area, and an access control unit permitting or blocking an access to the hidden area when the hidden area is set.

According to another aspect of the invention, a method of managing a hidden area that, in a file system having a FAT area, a directory entry area, and a data area, sets a portion of the data area of the file system as a hidden area, and controls an access to the set hidden area, includes setting a portion of the data area as a hidden area, recording meta data for the set hidden area, and permitting or blocking an access to the set hidden area using the recorded meta data.

BRIEF DESCRIPTION OF THE DRAWINGS

The above and/or other aspects of the present invention will become more apparent by describing in detail preferred embodiments thereof with reference to the attached drawings, in which.

DETAILED DESCRIPTION OF THE EXEMPLARY EMBODIMENTS

Figure 1:
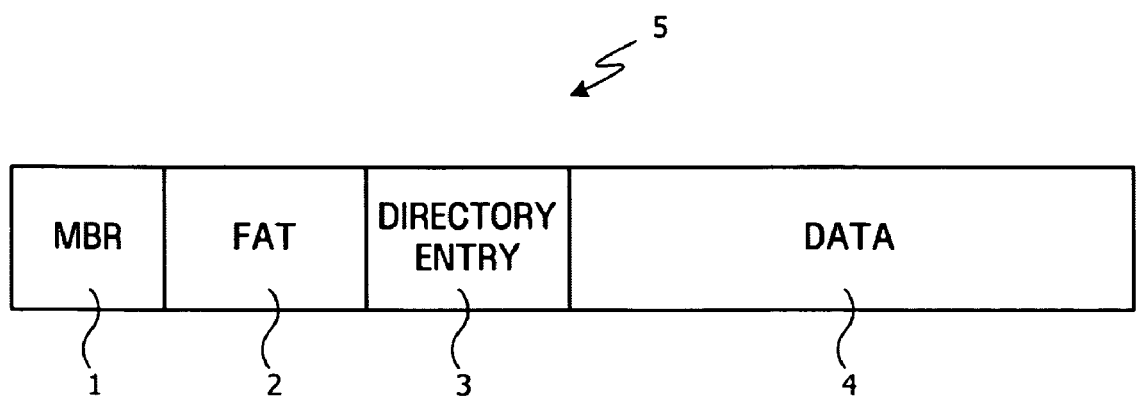
FIG. 1 is a diagram showing the schematic configuration of a FAT file system.

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 2:
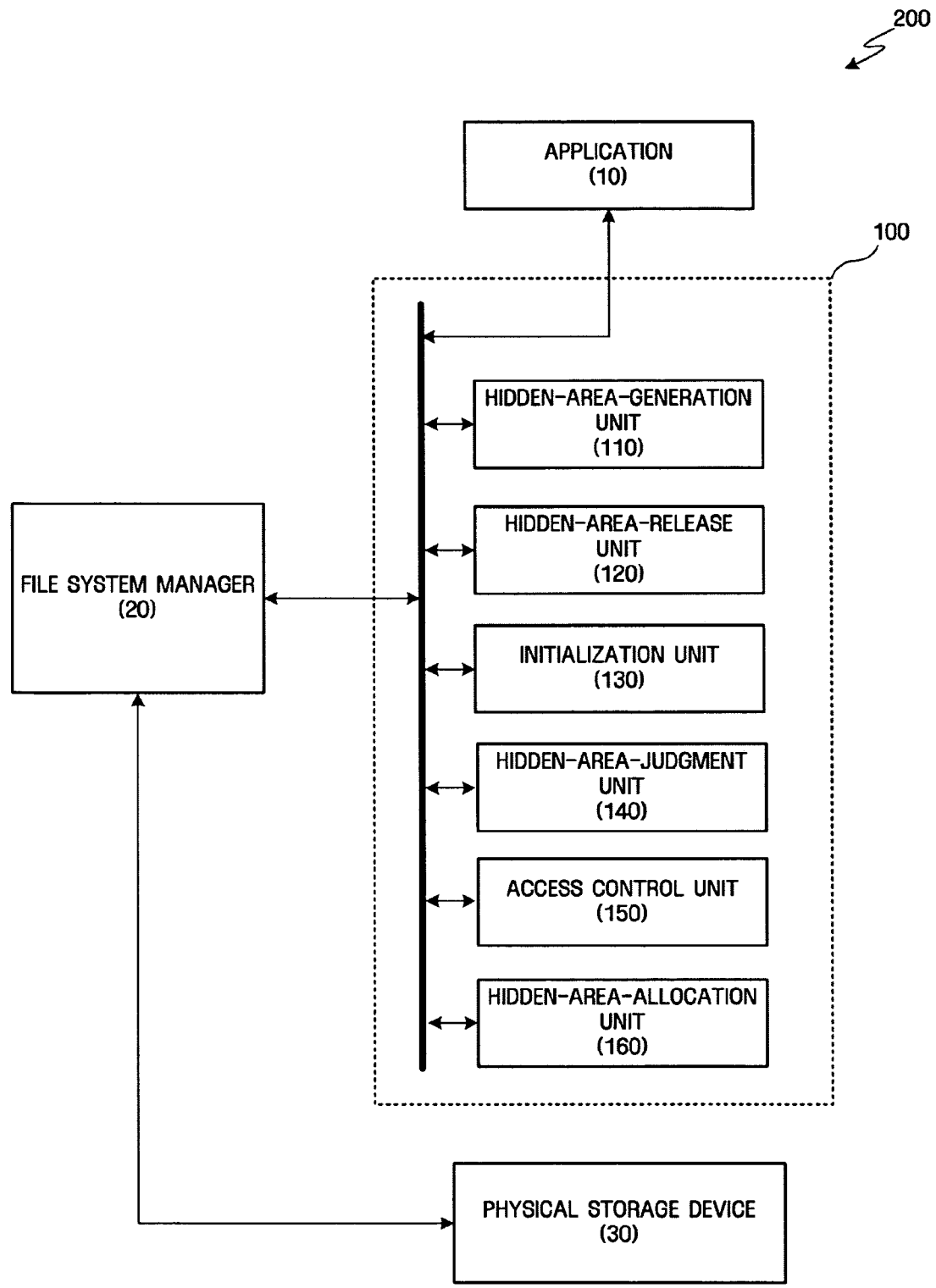
FIG. 2 is a block diagram showing the configuration of a system that controls an access to data stored in a physical storage device using an apparatus for managing a hidden area according to an exemplary embodiment of the invention.

FIG. 2 is a block diagram showing the configuration of an apparatus for managing a hidden area 100 (hereinafter, referred to as a hidden area management apparatus) according to an exemplary embodiment of the invention and a system 200 that controls an access to data stored in a physical storage device 30 using the hidden area management apparatus 100. The system 200 may be in the form of a computer, a digital TV, a cellular phone, a Personal Digital Assistant (PDA), a Portable Multimedia Player (PMP), an MP3 player, a USB memory stick, and so on. When the physical storage device 30 is included, and the file system is used, other apparatuses can be used.

The physical storage device 30 can be implemented by a nonvolatile memory element, such as a flash memory, a hard disk, or an optical disk, a volatile memory element, such as RAM, a hard disk, an optical disk, a magnetic disk, or other arbitrary forms.

When an application 10 attempts to access specified data, the hidden area management apparatus 100 judges whether or not the data belongs to a hidden area and, if the data does not belong to the hidden area, permits an access through a known file system 20. However, if the data belongs to the hidden area, accessibility is determined by a method that is suggested in the invention.

The hidden area management apparatus 100 is a logical constituent element, and may include a hidden area generation unit 110, a hidden area release unit 120, an initialization unit 130, a hidden area judgment unit 140, an access control unit 150, and a hidden area allocation unit 160.

Figure 3:
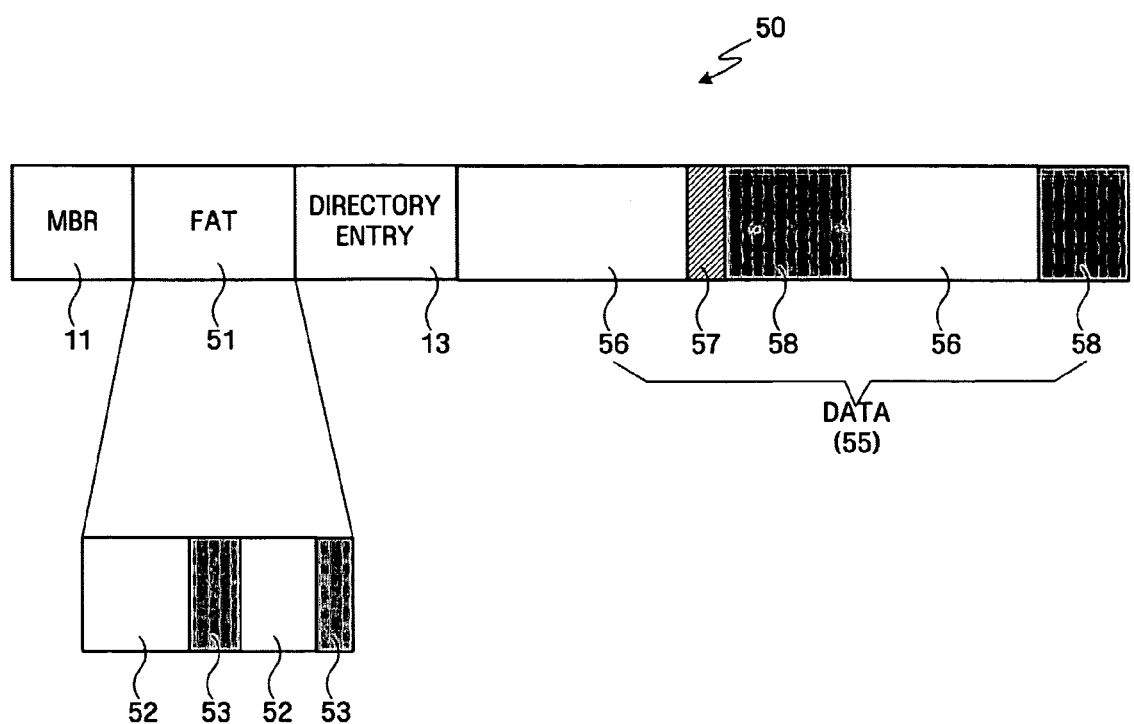
FIG. 3 is a diagram showing a file system according to an exemplary embodiment of the invention.

FIG. 3 is a diagram showing the configuration of a file system 50 according to an exemplary embodiment of the invention. Unlike the conventional file system 10, a FAT area 51 of the file system 50 is divided into an area 52 where a FAT for the general data is recorded, and an area 53 where a FAT for the hidden data is recorded. However, the area 52 where the FAT for the hidden data is recorded is not fixed. The area 52 merely refers to an area where a FAT mapped to a variable position in the actual data area 55, at which the hidden data is recorded, is recorded. The same method of recording the FAT is applied to the area 51 and the area 52.

The data area 55 includes an area 56 where general data is recorded, an area 58 (hereinafter, referred to as "hidden area") where hidden data is recorded, and an area 57 where meta data for the hidden area 58 is recorded.

In general, in order to record data in a file, a user searches an empty cluster number from the FAT area 51 and records data in the data area 55 indicated by the cluster number. In order for the user to delete data, data is not actually deleted from the data area 55, and only the mapped cluster number of the FAT area 51 is deleted. Then, the undeleted data is actually deleted upon overwriting.

Further, when any one of the cluster numbers of the FAT is displayed as being a defective cluster, the data area mapped to that address is not used. If data is written in a physically defective data area, data may be lost. Typically, "0x0FF7" in the FAT12, "0xFFF7" in the FAT16, and "0x0FFFFFF7" in the FAT32 are used to display bad clusters.

In a state where the hidden area is set, if an application (or an operating system) accesses a cluster number mapped in the hidden data of the FAT area, the access control unit 150 outputs a bad cluster display to the application, the access control unit 150 does not actually show an address recorded in that cluster number. In such a manner, the application cannot read the data area where the hidden data is stored, and as such, overwriting with another data can be prevented. Therefore, until the set hidden area is released, the hidden data can be safely protected from the application.

Furthermore, in a Microsoft Windows operating systems environment, a file system manager is provided, and a direct access to the data area 55 by sectors may be performed. If a direct access, such as reading/writing, to sectors of the hidden area is attempted when the hidden area is set, the access control unit 150 rejects the access such as reading/writing.

In order to access files or directories in the hidden area, a name of a prescribed hidden root directory is used in the exemplary embodiment of the present invention. The hidden root directory can be changed according to settings of the user. Hereinafter, in the description of the exemplary embodiment of the present invention, "c:\hidden" is set to the hidden root directory.

The hidden area generation unit 110 sets a portion of the data area 55 as the hidden area. To this end, the hidden area generation unit 110 generates meta data for the hidden area. A position where the meta data is recorded can be determined by using a last cluster or using a fixed cluster number.

From a compatibility standpoint, the last cluster may be used. From a security standpoint the fixed cluster number may be used. This is because, if the meta data of the hidden area is stored in a cluster assigned for each file system, even a file system having a hidden area management function does not find initial information of the hidden area. Therefore, with the use of the fixed cluster number, the security can be further improved.

Before the hidden area is set, the entire data area 55 is a general data area. In this case, any hidden data is not recorded, and a FAT-compatible file system manager 20 can access this area.

Figure 4:
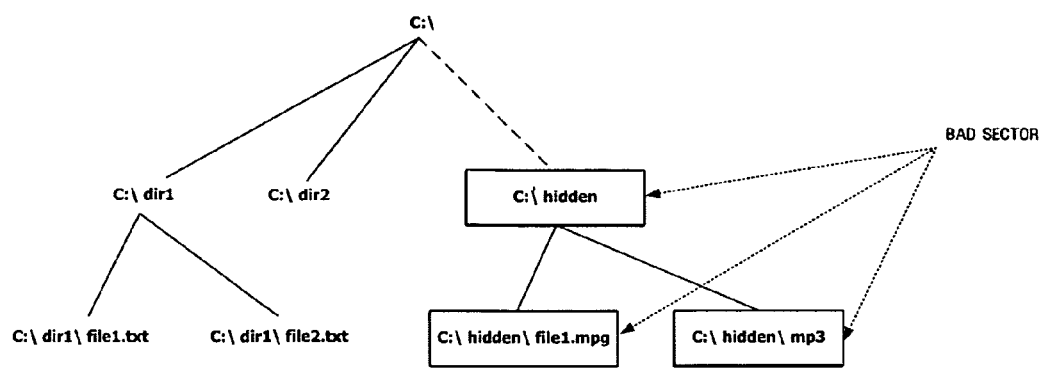
FIG. 4 is a diagram showing a file tree structure where a hidden area is set.

FIG. 4 is a diagram illustrating a file tree structure when the hidden area is set. The hidden root directory "c:\hidden" is a subdirectory of a root directory (c:\), but, when the hidden area is set, the hidden root directory is disconnected from the root directory, and all the hidden root directory, subordinate files, subdirectories are shown as the "bad" sectors.

Figure 5:
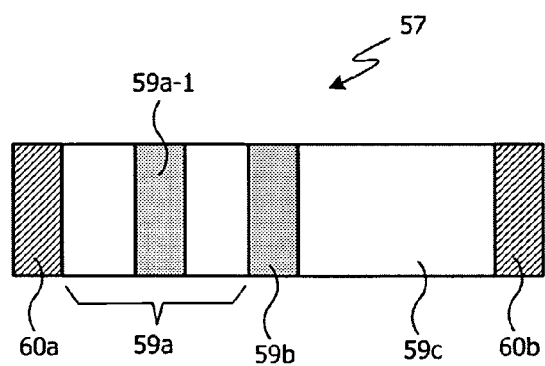
FIG. 5 is a diagram showing a structure of a meta data cluster on a hidden area according to an exemplary embodiment of the invention.

For setting the hidden area, first, the hidden area generation unit 110 records meta data cluster 57 for the hidden area, as shown in FIG. 5. The meta data cluster 57 includes a directory entry 59a of the hidden root directory, and a first field 59b where a number of a cluster recorded with cluster identification information for identifying a hidden cluster and a general cluster is recorded. Further, the meta data cluster 57 may further include a first signature 60a that is recorded in a head portion of the cluster 57, and a second signature 60b that is recorded in an end portion of the cluster 57.

In general, the directory entry includes detailed information on the directory or file, that is, name, extension, size, generation date and time, number of a first cluster of the directory or file, and attribute. The directory entry 59a of the hidden root directory has the same construction. Therefore, the directory entry 59a at least includes a second field 59a-1 where at least the first cluster number of the hidden root directory is recorded.

The capacities of the fields 59a, 59b, 60a, and 60b do not exceed one cluster, and a blank space 59c can exist in the cluster 57. The signatures 60a and 60b are values (numerical string or character string) that are recorded in order to ensure validity of data therebetween. These values are unique for each system, but the same value can be recorded in the first signature 60a and the second signature 60b. Alternatively, different unique values may be recorded in the first and second signatures 60a and 60b. If any one of the first signature 60a and the second signature 60b does not have the unique value, data therebetween is invalid.

The hidden area generation unit 110 records a directory entry of subdirectories or files in the hidden root directory in clusters that are mapped to the first cluster number recorded in the second field 59a-1 of the data area 55.

If the subdirectories or files other than the hidden root directory do not exist when the hidden area is generated, a process of recording the directory entry in the cluster to be mapped may be omitted.

For example, in case of a file called "file1.mpg" of FIG. 4, the name is file 1, and the extension is mp3. A position of a first cluster where the file called file1.mpg is recorded can be known by reading the cluster number of the file. Then, connected clusters other than the first cluster can be known by reading the FAT area 51. This is because a cluster number at a position corresponding to the first cluster number of the file in the FAT area 51 represents positions of next connected clusters of the first cluster. As such, clusters are connected until an EOF (End of File) indication is shown, and then one file called file1.mpg can be completely read.

Similarly, the content of "c:\hidden\mp3", a subdirectory of "c:\hidden", that is, the directory entry of the subdirectories or files of "c:\hidden\mp3" can be read.

Meanwhile, the hidden area generation unit 110 records, in the clusters mapped to the cluster number recorded in the first field 59b, the cluster identification information indicating which clusters among all the clusters belong to the hidden area and which clusters belong to the data area. By reading the first cluster number and the FAT area 51 of the hidden root directory, it is possible to know which clusters or sectors are the hidden area. However, in an application, such as an operating system, since the FAT is incorporated therein, a direct access to the data area 55 may be performed by clusters or sectors, without referring to the FAT area 51. In this case, in order to reduce the number of operations and to provide a rapid response (pertaining to access permission or rejection), the cluster identification information is recorded in advance.

In order to record the cluster identification information in the corresponding cluster, various methods can be used. For example, a method that arranges identification bits for all the clusters in sequence (for example, 1 represents a hidden cluster, and 0 represents a general cluster), a method that records only numbers of hidden clusters, and a method that arranges identification bits for cluster groups, each group having N clusters, in a row can be exemplified. However, in order to apply the third method, hidden data should be actually recorded on the basis of N clusters (cluster group).

In a hidden area generation process, the hidden clusters include clusters of files or directories actually included in the hidden root directory, and empty hidden clusters, having a predetermined size, that are allocated to store hidden data in the future. In such a manner, hidden data can be added with no additional operation. However, when all the empty hidden clusters are used as the hidden data is added, a process of securing hidden clusters is additionally required. This process is performed by the hidden area allocation unit 160.

As such, the hidden area generation unit 110 records the meta data for the hidden area, the directory entry for the subdirectories or files of the hidden root directory, and the cluster identification information.

Returning to FIG. 2, according to a user's command, the hidden area release unit 120 releases the hidden area generated by the hidden area generation unit 110. The release of the hidden area is simply achieved by including the directory entry of the hidden root directory (c:\hidden), which is not included in the root directory (c:\) and exists in a separate area, in the root directory. The directory entry of the hidden root directory can be known by reading the field 59a of the meta data cluster 57. At this time, the meta data cluster 57 generated by the hidden area generation unit 110 and the cluster where the cluster identification information is recorded are returned to the empty clusters. However, the directory entry of the subordinate files or subdirectories of the hidden root directory are kept as it is. This is because the directory entry of the hidden root directory is not included in the root directory, but a structure from the hidden root directory to the subdirectory follows a known FAT file structure.

Such a process of releasing the hidden area corresponds to a process of generating a connection of "c:\" and "c:\hidden" in FIG. 4. As such, after the hidden area is released, the file system has the same structure as a general FAT-compatible file system. Therefore, the access control unit 150 does not limit an access to the FAT area 51 and the data area 55.

Further, the hidden area release unit 120 changes at least one of the first signature 60a and the second signature 60b in order to indicate that the set hidden area is released, and invalidates the meta data cluster 57.

Figure 6:
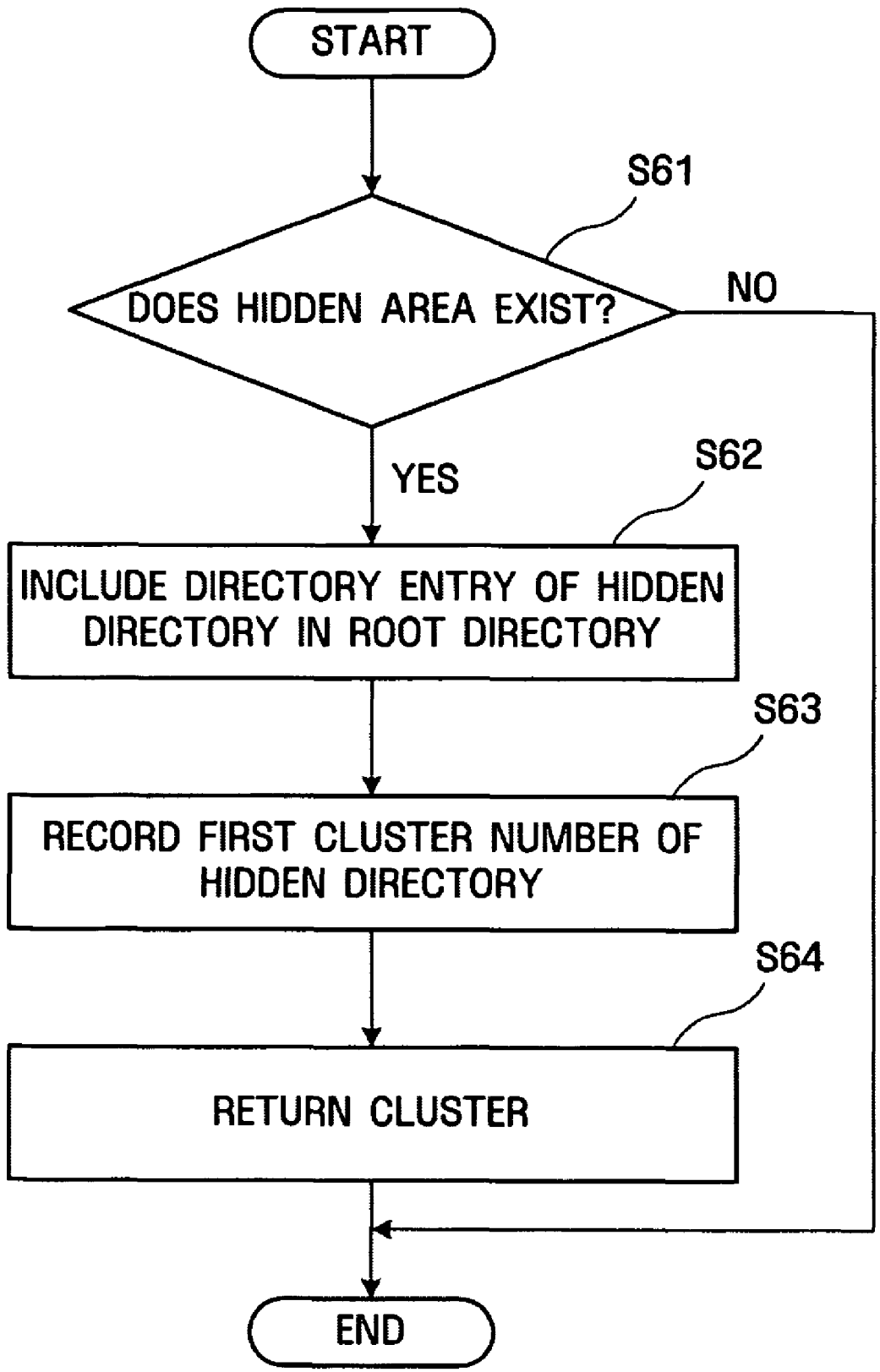
FIG. 6 is a flowchart showing a process of releasing hidden area by a hidden area release unit.

FIG. 6 is a flowchart showing a process of releasing the hidden area.

First, the hidden area release unit 120 judges whether or not the hidden area exists (Step S61). A method of judging whether or not the hidden area exists will be described below in detail with reference to FIG. 8.

If the hidden area exists (Yes in Step S61), the directory entry of the hidden root directory is included in the root directory (Step S62). For example, in FIG. 4, before the hidden area is released, only the directory entries of "c:\dir1" and "c:\dir2" are included in the root directory. However, after the hidden area is released, the directory entry of "c:\hidden" is additionally included. As described above, the directory entry includes the name, the extension, the size, the generation date and time, the first cluster number of the hidden root directory, and the attribute.

At this time, in the first cluster number of the detailed information, the first cluster number of the hidden root directory is recorded. The first cluster number is recorded in the second field 59*a*-1 of the meta data cluster 57.

Finally, the hidden area release unit 120 returns the meta data cluster 57, and the cluster where the cluster identification information for identifying the hidden cluster and the general cluster are recorded. For this return, the cluster numbers in the FAT area 51 mapped to the clusters are deleted.

The hidden area generation and release processes are initiated by the user's command, and, when the command is input, information for identifying the user, such as a password, may be sent to the user.

When a disk volume is mounted, the initialization unit 130 checks whether or not a hidden area exists in the volume, and, if the hidden area exists, loads information of the hidden area in a meta data cluster for the hidden area into a memory.

Figure 7:
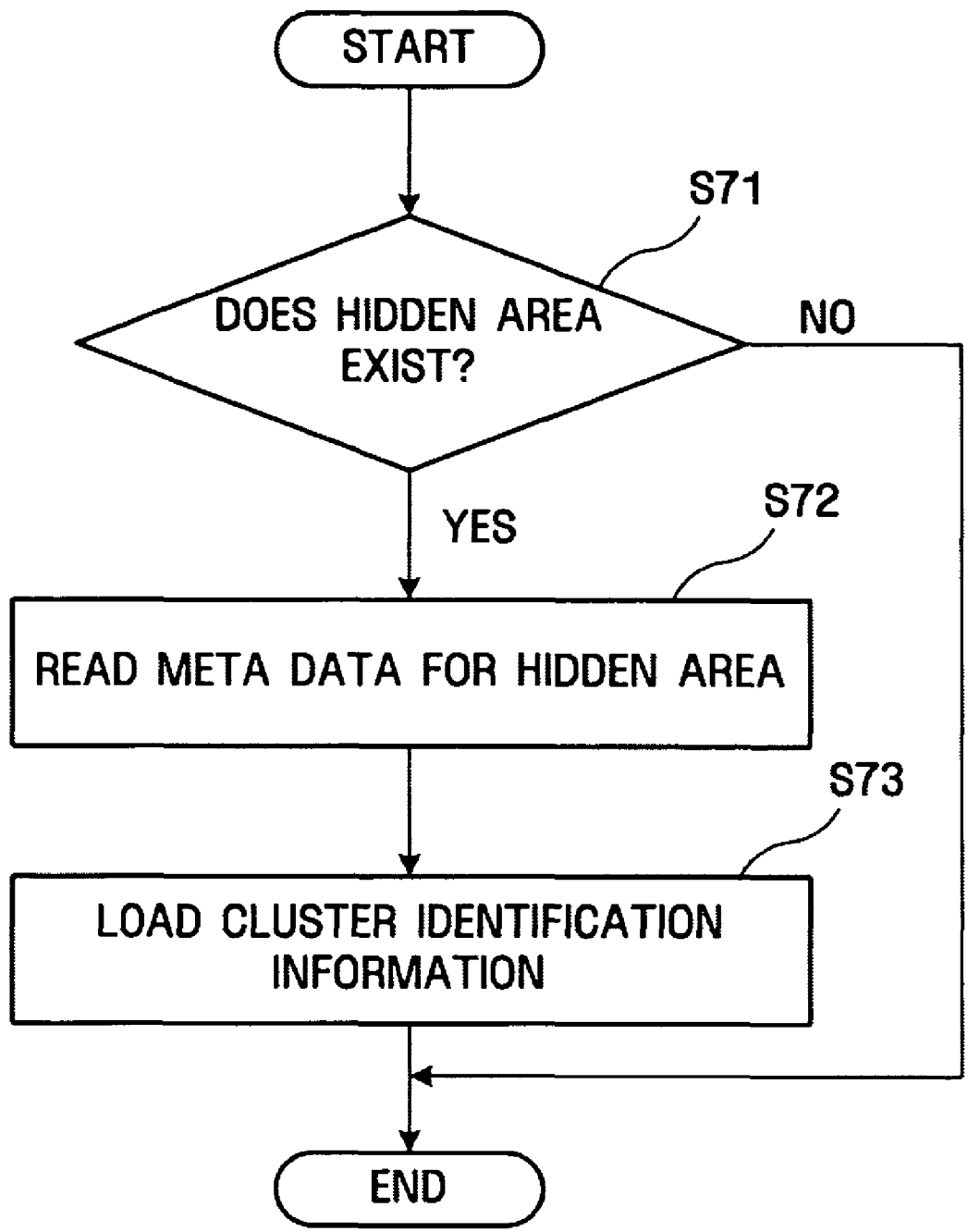
FIG. 7 is a diagram showing an initialization process by an initialization unit.

FIG. 7 is a flowchart showing an initialization process by the initialization unit 130.

First, the initialization unit 130 judges whether or not the hidden area exists (Step S71). A method of judging whether or not the hidden area exists will be described below in detail with reference to FIG. 8.

If the hidden area exists (Yes in Step S71), meta data 59*a* and 59*b* for the hidden area is read (Step S62). The meta data includes a first cluster number of a hidden root directory, and a cluster number recorded with cluster identification information. Next, the initialization unit 130 loads the meta data and the cluster identification information into the memory (Step S73). Subsequently, the access control unit 150 can immediately know whether to block an access when the clusters or sectors, which the application 10 attempts to access, belong to the hidden clusters.

Figure 8:
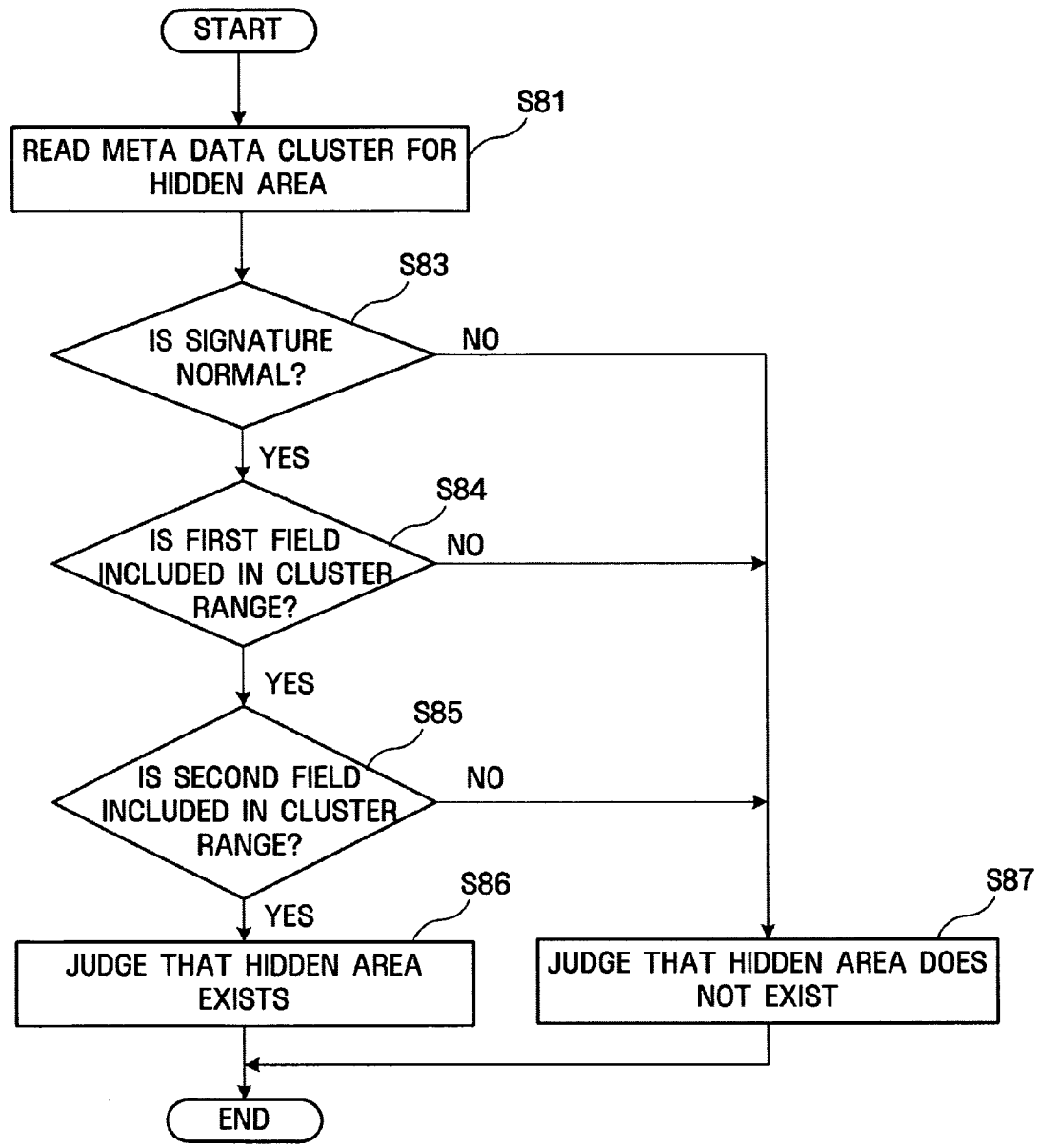
FIG. 8 is a flowchart showing a process of judging whether or not a hidden area exists.

Meanwhile, the hidden area judgment unit 140 judges whether the hidden area exists, using signatures 60*a* and 60*b* included in the meta data cluster 57 and the content recorded in the fields 50*a* and 50*b* (whether the hidden area is set). FIG. 8 is a flowchart showing a process of judging whether the hidden area exists.

First, hidden area judgment unit 140 reads the meta data cluster 57 for the hidden area (Step S81). At this time, it is checked whether the first and second signatures 60*a* and 60*b* are normal. Whether the signatures are normal is checked according to whether the signatures keep predetermined values. If any one of the signatures is changed from the original predetermined value, it is judged that the signatures are abnormal.

If the signatures are normal (Yes in Step S83), it is judged whether the first cluster number of the hidden root directory recorded in the second field 59*a*-1 is included in a cluster range (Step S84). The cluster range signifies a range of cluster numbers that are allocated in a specified physical storage device 30. If a value outside of the cluster range is recorded in the second field 59*a*-1, the cluster number can be understood as being abnormal.

Following the judgment result of Step S84, the cluster number to be recorded in the first field 59*b* is checked to determine whether the cluster number is included in the cluster range. As described above, the cluster number to be recorded in the first field 59*b* is the number of the cluster where the cluster identification is recorded. If the second cluster number is determined to be within the cluster range (Yes in Step S85), it is finally judged that the hidden area exists (Step S86).

Meanwhile, in case of No at any one of Steps S83, S84, and S85, it is judged that the hidden area does not exist (Step S87).

Figure 9:
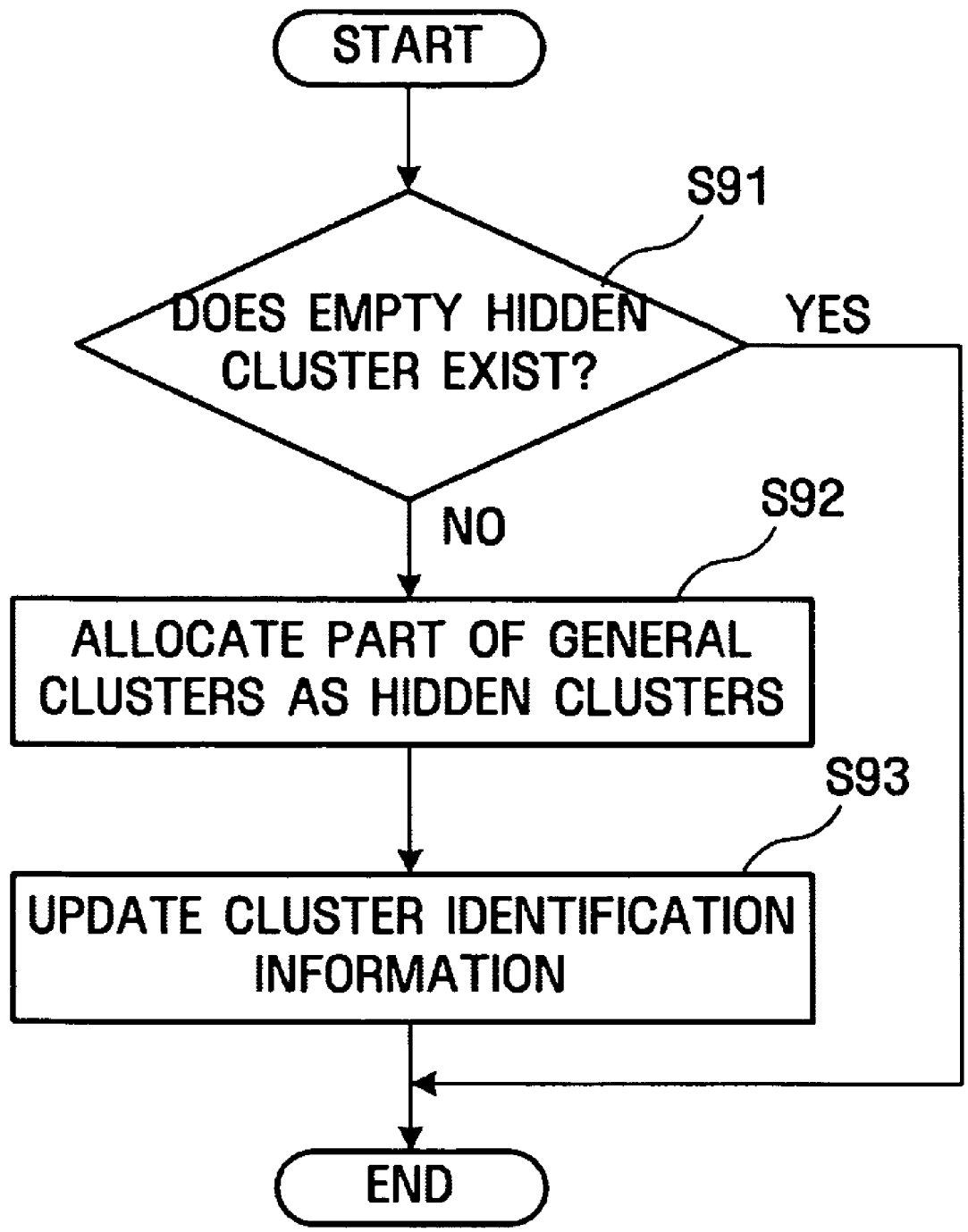
FIG. 9 is a flowchart showing a process of additionally allocating a hidden cluster.

When all hidden clusters currently allocated are used, the hidden area allocation unit 160 additionally allocates a hidden cluster. FIG. 9 is a flowchart showing a process of additionally allocating a hidden cluster.

If a data write command is input to the hidden root directory or the subdirectory, the hidden area allocation unit 160 first judges whether or not an empty hidden cluster among currently allocated hidden clusters exists (Step S91). If so, the hidden cluster does not need to be additionally allocated, and thus the process ends.

If however no empty hidden cluster exists (No in Step S91), some of the general clusters are allocated as the hidden clusters (Step S92). An allocation size can be arbitrarily determined. For example, the same allocation size as the size initially allocated by the hidden area generation unit 110 can be used.

Then, the cluster identification information stored in the cluster mapped to the cluster number of the first field 59*b* is updated (Step S93). That is, an identification indication of the allocated general cluster is changed to an identification indication of the hidden cluster.

When the application accesses (by reading or writing) the FAT area 51 or the data area 55, the access control unit 150 permits or blocks the access to the hidden area depending on whether the hidden area exists.

In a state where the hidden area is set, when the application accesses the cluster number mapped to the hidden data in the FAT area 51, the address recorded in the cluster number is not known, and as such, bad cluster display is output to the application. Further, in a state where the hidden area is set, when an access to the hidden cluster in the data area 55 is attempted, the access control unit 150 rejects the access.

At this time, an access to the hidden cluster of the FAT area 51 or the data area 55 or an access to the general cluster can be simply differentiated by referring to the cluster identification information loaded into the memory.

Only when an access is normally made through the meta data cluster 57, the access control unit 150 permits the normal access to the hidden area. With the meta data cluster 57, the number of the cluster where the directory entry of the subdirectories or files in the hidden root directory can be known. By confirming the first cluster number and the FAT area 51 in the directory entry, the data to be accessed can be read, and the read result can be provided to the application 10.

When a known apparatus not having the hidden area management apparatus 100 accesses the file system 50, since the meta data cluster 57 cannot be read, the apparatus cannot access any data included in the hidden area.

Further, even the apparatus 200 having the hidden area management apparatus 100 can be configured not to read the meta data cluster 57 for other apparatuses. To this end, a method that sets the position of the meta data cluster 57 to vary by apparatuses 200, a method that sets the signatures 60*a* and 60b included in the meta data cluster 57 to vary, and a method that sets the name of the hidden root directory different are used.

Of the above-described methods, in the first method and the second method, the portion where the meta data for the hidden area is stored is allowed to be not found. Of these, the first method varies the position of the portion where the meta data is stored. Then, even the apparatus 200 having the hidden area management apparatus 100 cannot access as long as it does not know the position.

According to the second method, the signatures 60a and 60b that are used for judging whether or not the hidden area exists are set to vary depending on the type of apparatus accessing the hidden area, and thus other unauthorized apparatuses can not confirm the signatures. As a result, it is judged that the hidden area does not exist.

According to the third method, the directory name (for example, hidden) of the hidden root directory is set to vary according to the type of apparatus accessing the hidden root directory, and thus other apparatuses do not access the hidden root directory. For example, an apparatus, in which the hidden root directory is set to "c:\hide", cannot access the hidden area of an apparatus, in which the hidden root directory is set to "c:\hidden".

The constituent elements of FIG. 2 can be implemented by software, such as tasks, classes, subroutines, processes, objects, threads, programs, hardware, such as Field-Programmable Gate Array (FPGA) or Application-Specific Integrated Circuit (ASIC), or a combination of software and hardware. The constituent elements may be included in a computer-readable storage medium or may be distributed into a plurality of computers.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

As described above, according to the exemplary embodiments of the present invention, the hidden area in the file system level can be provided while the compatibility with the existing file system is supported. Therefore, user data to be secured can be protected.

What is claimed is:

1. An apparatus in a file system including a File Allocation Table (FAT) area, a directory entry area, and a data area, the FAT area, the directory entry area, and the data area being separate and non-overlapping, the apparatus managing a hidden area by setting a portion of the data area as the hidden area and controlling an access to the set hidden area, the apparatus comprising:
    a processor;
    a hidden area generation unit, which under control of the processor, sets the portion of the data area as the hidden area and records meta data for the set hidden area in a cluster of the data area and cluster identification information for identifying a hidden area in clusters of the data area, wherein cluster numbers of the clusters are recorded in the meta data;
    a hidden area release unit which moves a directory entry of a root directory of the hidden area into the directory entry area and returns the cluster recorded with the meta data and the clusters recorded with the cluster identification information to release the set hidden area; and
    an access control unit which controls the access to the hidden area in a state where the hidden area is set.

2. Apparatus of claim 1, further comprising an initialization unit which judges whether a hidden area exists in a data storage medium when the data storage medium is mounted on the file system and loads meta data of the hidden area of the data storage medium into a memory when the hidden area exists in the data storage medium.

3. The apparatus of claim 2, further comprising a hidden area judgment unit which judges whether the hidden area of the data storage medium exists, with a signature included in the meta data of the hidden area of the data storage medium.

4. The apparatus of claim 1, further comprising a hidden area allocation unit which additionally allocates a hidden area when all hidden areas currently allocated are used.

5. The apparatus of claim 1, wherein the meta data comprises a first field where the cluster numbers of the clusters including cluster identification information for identifying the hidden area are recorded, and a second field where a first cluster number of a hidden root directory is recorded.

6. The apparatus of claim 5, wherein the meta data comprises at least one signature which indicates that the first field or the second field is invalid when a predetermined value is recorded and the recorded value is changed.

7. The apparatus of claim 5, wherein the hidden area release unit records the first cluster number recorded in the second field in the directory entry area.

8. The apparatus of claim 5, wherein the hidden area generation unit displays the cluster identification information in clusters, which are mapped to the cluster number recorded in the first field, by one bit for each cluster.

9. The apparatus of claim 1, wherein, the access control unit outputs a defective cluster display to an application when the hidden area is set and when the application attempts to access a hidden cluster number of the FAT area.

10. The apparatus of claim 1, wherein, the access control unit blocks the access, when an application directly accesses a hidden cluster or a hidden sector of the data area.

11. The apparatus of claim 1, wherein the access control unit permits the access, when the access is normally performed using the meta data.

12. The apparatus of claim 3, wherein the hidden area judgment unit judges that the hidden area does not exist, when the signature is not changed from a predetermined value, and when the cluster number of a first field and a second field in the meta data is included in a cluster range.

13. The apparatus of claim 1, wherein the cluster where the meta data is recorded is a last cluster of the data area.

14. The apparatus of claim 1, wherein the cluster where the meta data is recorded exists at a fixed position of the data area.

15. A method of managing a hidden area in a file system including a File Allocation Table (FAT) area, a directory entry area, and a data area the FAT area, the directory entry area, and the data area being separate and non-overlapping, the method comprising:
    setting a portion of the data area as the hidden area;
    recording meta data for the set hidden area in a cluster of the data area and cluster identification information for identifying a hidden area in clusters of the data area, wherein cluster numbers of the clusters are recorded in the meta data; and
    controlling an access to the set hidden area using the recorded meta data in a state where the hidden area is set.

16. The method of claim 15, further comprising:
    moving a directory entry of a root directory of the hidden area into the directory entry area; and
    returning the cluster recorded with the meta data and the clusters recorded with the cluster identification information to release the set hidden area.

17. The method of claim 15, further comprising:
  judging whether a hidden area exists in a data storage medium when the data storage medium is mounted on the file system; and
  loading meta data of the data storage medium into a memory when the hidden area exists within the data storage medium.

18. The method of claim 17, wherein the judging whether the hidden area exists is performed with a signature included in the meta data of the hidden area of the data storage medium.

19. The method of claim 15, further comprising, additionally allocating a hidden area, when all hidden areas currently allocated are used.

20. The method of claim 15, wherein the meta data comprises a first field where the cluster numbers of the clusters including cluster identification information for identifying the hidden area are recorded, and a second field where a first cluster number of a hidden root directory is recorded.

21. The method of claim 20, wherein the meta data comprises at least one signature indicating that the first field or the second field is invalid when a predetermined value is recorded and the recorded value is changed.

22. The method of claim 16, wherein the moving the directory entry of the root directory of the hidden area comprises recording a directory entry of subdirectories or files of the root directory of the hidden area in the directory entry area.

23. The method of claim 15, wherein the controlling the access to the set hidden area comprises outputting defective cluster display to the application, when an application attempts to access a hidden cluster number of the FAT area.

24. The method of claim 15, wherein the controlling the access to the set hidden area comprises blocking the access, when an application directly accesses a hidden cluster or a hidden sector of the data area.

25. The method of claim 15, wherein the controlling the access to the set hidden area comprises permitting the access, when an access is normally performed using the meta data.

26. The method of claim 17, wherein the judging whether a hidden area exists in the data storage medium comprises determining that the hidden area does not exist, when the signature is not changed from the predetermined value, and when the cluster number of a first field and a second field in the meta data is included in a cluster range.

27. The method of claim 15, wherein the cluster where the meta data is recorded is a last cluster of the data area.

28. The method of claim 15, wherein the cluster where the meta data is recorded exists at a fixed position of the data area.

* * * * *